(12) United States Patent
Choi et al.

(10) Patent No.: US 12,015,120 B2
(45) Date of Patent: Jun. 18, 2024

(54) ADDITIVE, ELECTROLYTE FOR RECHARGEABLE LITHIUM BATTERY, AND RECHARGEABLE LITHIUM BATTERY

(71) Applicant: SAMSUNG SDI CO., LTD., Yongin-si (KR)

(72) Inventors: Hyunbong Choi, Yongin-si (KR); Younghye Kang, Yongin-si (KR); Dongyoung Kim, Yongin-si (KR); Soojin Kim, Yongin-si (KR); Aeran Kim, Yongin-si (KR); Suyeol Ryu, Yongin-si (KR); Jeongmin Shin, Yongin-si (KR); Junyong Lee, Yongin-si (KR); Tae Jin Lee, Yongin-si (KR); Jin-Hyeok Lim, Yongin-si (KR); Myunghwan Jeong, Yongin-si (KR); Wonseok Cho, Yongin-si (KR); Pavel Shatunov, Yongin-si (KR); Jungmin Han, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 364 days.

(21) Appl. No.: 16/927,116

(22) Filed: Jul. 13, 2020

(65) Prior Publication Data
US 2021/0020989 A1    Jan. 21, 2021

(30) Foreign Application Priority Data

Jul. 18, 2019  (KR) .................. 10-2019-0087161
Feb. 14, 2020  (KR) .................. 10-2020-0018300

(51) Int. Cl.
*H01M 10/0567*    (2010.01)
*H01M 4/02*       (2006.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ......... H01M 10/0567; H01M 10/0525; H01M 10/0569; H01M 4/505; H01M 4/525;
(Continued)

(56) References Cited

U.S. PATENT DOCUMENTS

2007/0048622 A1* 3/2007 Yoon ................. H01M 10/0568
                                                         429/329
2013/0004862 A1   1/2013 Miyoshi et al.

FOREIGN PATENT DOCUMENTS

CN    102093417 B    11/2012
JP    10-050342 A    2/1998
(Continued)

OTHER PUBLICATIONS

Otto Dahl, "Reactions of Aminophosphines with trifluormethanesulfonic acid: phosphenium ion (two-coordinate phosphorus ion) or tricovalent phosphorus products", Tetrahedron Letters, vol. 23, No. 14, Jan. 1982 (Jan. 1, 1982), pp. 1493-1496, XP055744360, Amsterdam, NL.
(Continued)

*Primary Examiner* — Adam A Arciero
(74) *Attorney, Agent, or Firm* — Lee IP Law, P.C.

(57) ABSTRACT

An additive, an electrolyte for a rechargeable lithium battery, and a rechargeable lithium battery, the additive being represented by Chemical Formula 1:
(Continued)

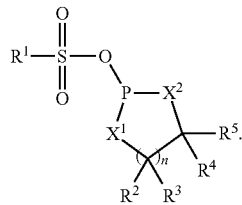

[Chemical Formula 1]

14 Claims, 4 Drawing Sheets

(51) Int. Cl.
    *H01M 4/38*       (2006.01)
    *H01M 4/505*     (2010.01)
    *H01M 4/525*     (2010.01)
    *H01M 10/0525*  (2010.01)
    *H01M 10/0569*  (2010.01)

(52) U.S. Cl.
    CPC ... *H01M 10/0525* (2013.01); *H01M 10/0569* (2013.01); *H01M 2004/027* (2013.01); *H01M 2004/028* (2013.01); *H01M 4/382* (2013.01); *H01M 2300/0025* (2013.01); *H01M 2300/0028* (2013.01); *Y02E 60/10* (2013.01)

(58) Field of Classification Search
    CPC .......... H01M 4/382; H01M 2004/027; H01M 2004/028; H01M 2300/0028
    See application file for complete search history.

(56) References Cited

FOREIGN PATENT DOCUMENTS

| | | |
|---|---|---|
| JP | 5949605 B2 | 7/2016 |
| JP | 2016-207447 A | 12/2016 |
| KR | 10-2013-0018238 A | 2/2013 |

OTHER PUBLICATIONS

Yu, Bi Tao, et al., "A study on sulfites for lithium-ion battery electrolytes", Journal of Power Sources, Elsevier SA, CH, vol. 158, No. 2, Aug. 25, 2006 (Aug. 25, 2006), pp. 1373-1378, XP027938890.
Extended European Search Report dated Nov. 4, 2020.
Chinese Office action and Search Report dated Jan. 31, 2023.

\* cited by examiner

ADDITIVE, ELECTROLYTE FOR RECHARGEABLE LITHIUM BATTERY, AND RECHARGEABLE LITHIUM BATTERY

CROSS-REFERENCE TO RELATED APPLICATION

Korean Patent Application No. 10-2019-0087161 filed on Jul. 18, 2019 in the Korean Intellectual Property Office, and Korean Patent Application No. 10-2020-0018300, filed on Feb. 14, 2020, in the Korean Intellectual Property Office, and entitled: "Additive, Electrolyte for Rechargeable Lithium Battery, and Rechargeable Lithium Battery," are incorporated by reference herein in their entirety.

BACKGROUND

1. Field

Embodiments relate to an additive, an electrolyte for a rechargeable lithium battery including the same, and a rechargeable lithium battery.

2. Description of the Related Art

A rechargeable lithium battery may be recharged and may have three or more times as high energy density per unit weight as a lead storage battery, a nickel-cadmium battery, a nickel hydrogen battery, a nickel zinc battery, or the like. It may be also charged at a high rate and thus, is commercially manufactured for a laptop, a cell phone, an electric tool, an electric bike, and the like, and additional improvement of energy density have been considered.

Such a rechargeable lithium battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

An electrolyte may include an organic solvent in which a lithium salt is dissolved and may determine stability and performance of a rechargeable lithium battery.

SUMMARY

The embodiments may be realized by providing an additive represented by Chemical Formula 1:

[Chemical Formula 1]

wherein, in Chemical Formula 1, $X^1$ and $X^2$ are each independently O, S, $CR^aR^b$, or $NR^c$, at least one of $X^1$ and $X^2$ being O or S, $R^1$ is a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, $R^a$, $R^b$, $R^c$, and $R^2$ to $R^5$ are each independently hydrogen, a substituted or unsubstituted C1 to C5 alkyl group, a substituted or unsubstituted C2 to C5 alkenyl group, or a combination thereof, and n is an integer selected from 1 to 3.

The additive represented by Chemical Formula 1 may be represented by Chemical Formula 1A:

[Chemical Formula 1A]

wherein, in Chemical Formula 1A, $X^1$, $X^2$, and $R^1$ to $R^5$ are defined the same as those of Chemical Formula 1.

The additive represented by Chemical Formula 1 may be represented by one of Chemical Formula 1-1 to Chemical Formula 1-3:

[Chemical Formula 1-1]

[Chemical Formula 1-2]

[Chemical Formula 1-3]

wherein, in Chemical Formula 1-1 to Chemical Formula 1-3, $R^1$ to $R^5$ and n are defined the same as those of Chemical Formula 1.

$R^1$ of Chemical Formula 1 may be a substituted or unsubstituted C1 to C10 alkyl group or a substituted or unsubstituted C2 to C5 alkenyl group.

The embodiments may be realized by providing an electrolyte for a rechargeable lithium battery, the electrolyte including a non-aqueous organic solvent, a lithium salt, and the additive according to an embodiment.

The additive may be included in the electrolyte in an amount of about 0.1 wt % to about 10 wt %, based on a total weight of the electrolyte for the rechargeable lithium battery.

The additive may be included in the electrolyte in an amount of about 0.1 wt % to about 3.0 wt %, based on a total weight of the electrolyte for the rechargeable lithium battery.

The embodiments may be realized by providing a rechargeable lithium battery including a positive electrode including a positive active material; a negative electrode comprising a negative active material; and the electrolyte according to an embodiment.

The positive active material may include a composite oxide including cobalt, manganese, nickel, or a combination thereof, and lithium.

The positive active material may be represented by Chemical Formula 2:

[Chemical Formula 2]

wherein, in Chemical Formula 2, $0.9 \le a \le 1.8$, $0 \le y1 < 1$, $0 \le z1 < 1$, $0 \le y1+z1 < 1$, and $M^1$, $M^2$, and $M^3$ may be each independently Ni, Co, Mn, Al, Sr, Mg, La, or a combination thereof.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided, 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an additive according to an embodiment is described.

The additive according to an embodiment may be represented by Chemical Formula 1.

[Chemical Formula 1]

In Chemical Formula 1, $X^1$ and $X^2$ may each independently be, e.g., O, S, $CR^aR^b$, or $NR^c$. In an implementation, at least one of $X^1$ and $X^2$ may be, e.g., O or S.

$R^1$ may be or may include, e.g., a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, $R^a$, $R^b$, $R^c$, and $R^2$ to $R^5$ may each independently be or include, e.g., hydrogen, a substituted or unsubstituted C1 to C5 alkyl group, a substituted or unsubstituted C2 to C5 alkenyl group, or a combination thereof, and n may be, e.g., an integer selected from 1 to 3.

In an implementation, when n is 2 or 3, the 2 or 3 $R^2$ and/or the 2 or 3 $R^3$ may be the same or different.

The additive according to an embodiment may include, e.g., a sulfite functional group (—$SO_3$—) and a cyclic phosphone functional group in one molecule, wherein the cyclic phosphone functional group is a phospholane derivatives.

These functional groups may be decomposed so as to be formed to lithium salts in the electrolyte to form a film on the surface of the positive electrode and the negative electrode, respectively, thereby exhibiting effects of an initial resistance reduction, suppression of storage resistance increase rates at a high temperature, and reduction of gas generation.

In an implementation, $PO_3Li^{2-}$ which is a lithium salt including a cyclic phosphone functional group constituting the lithium salt may move to the positive electrode to form a film on the surface of the positive electrode.

In an implementation, the cyclic phosphone functional group may have a lower oxidation potential than a linear phosphone functional group, it may be more easily oxidized to form a solid polyphosphate film on the surface of the positive electrode, thereby suppressing a collapse of the positive electrode and the high temperature of the battery and thus contributing to performance improvement.

In addition, $LiSO_3R^{1+}$, which is a lithium salt including a sulfite functional group constituting the lithium salt, may move to the negative electrode to be reductively decomposed at the surface of the negative electrode to form a solid electrolyte interface (SEI) film having excellent ion conductivity on the surface of the negative electrode. Accordingly, the initial formation of the SEI film may help suppress decomposition of the surface of the negative electrode which could otherwise occur during operations at high temperature cycles and may help prevent an oxidation reaction of the electrolyte and thus may decrease a resistance increase rate in the rechargeable lithium battery.

In an implementation, the additive may be represented by one of Chemical Formula 1A to Chemical Formula 1C.

[Chemical Formula 1A]

[Chemical Formula 1B]

[Chemical Formula 1C]

In Chemical Formula 1A to Chemical Formula 1C, definitions of $X^1$, $X^2$, and $R^1$ to $R^5$ may be the same as those of Chemical Formula 1, and $R^{2'}$, $R^{2''}$, $R^{3'}$, and $R^{3''}$ may be defined the same as $R^2$ and $R^3$ of Chemical Formula 1.

In an implementation, the additive may be represented by Chemical Formula 1A or Chemical Formula 1B, e.g., may be represented by Chemical Formula 1A.

In an implementation, the additive may be represented by one of Chemical Formula 1-1 to Chemical Formula 1-3.

[Chemical Formula 1-1]

[Chemical Formula 1-2]

[Chemical Formula 1-3]

In Chemical Formula 1-1 to Chemical Formula 1-3, definitions of $R^1$ to $R^5$ and n may be the same as those of Chemical Formula 1.

In an implementation, the additive may be represented by Chemical Formula 1-1 or Chemical Formula 1-2, e.g., may be represented by Chemical Formula 1-1.

In an implementation, n in Chemical Formulae 1-1 to 1-3 may be 1 or 2, e.g., n may be 1.

In an implementation, $R^1$ of Chemical Formula 1 may be, e.g., a substituted or unsubstituted C1 to C10 alkyl group or a substituted or unsubstituted C2 to C5 alkenyl group.

In an implementation, $R^1$ of Chemical Formula 1 may be, e.g., a substituted or unsubstituted C1 to C10 alkyl group. In an implementation, $R^1$ of Chemical Formula 1 may be, e.g., a methyl group, an ethyl group, an n-propyl group, or an iso-propyl group.

The electrolyte for a rechargeable lithium battery according to another embodiment may include, e.g., a non-aqueous organic solvent, a lithium salt, and the aforementioned additive.

The additive may be included in the electrolyte in an amount of about 0.1 wt % to about 10 wt %, e.g., about 0.1 wt % to about 5.0 wt % or about 0.1 wt % to about 3.0 wt %, based on a total weight of the electrolyte for the rechargeable lithium battery.

When the amount of the additive is as described above, the rechargeable lithium battery may have improved cycle-life characteristics by preventing increase in resistance at high temperatures and suppressing gas generation.

Maintaining the amount of the additive at about 0.1 wt % or greater may help prevent a reduction in the high temperature storage property. Maintaining the amount of the additive at about 10 wt % or less may help prevent an increase in an interface resistance, thereby preventing a reduction in cycle-life.

The non-aqueous organic solvent serves as a medium for transmitting ions taking part in the electrochemical reaction of a battery.

The non-aqueous organic solvent may include, e.g., a carbonate solvent, an ester solvent, an ether solvent, a ketone solvent, an alcohol solvent, or an aprotic solvent.

The carbonate solvent may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include, e.g., methyl acetate, ethyl acetate, n-propyl acetate, dimethylacetate, methylpropionate, ethylpropionate, propylpropionate, decanolide, mevalonolactone, caprolactone, or the like. The ether solvent may include dibutyl ether, tetraglyme, diglyme, dimethoxyethane, 2-methyltetrahydrofuran, tetrahydrofuran, or the like. The ketone solvent may include, e.g., cyclohexanone or the like. The alcohol solvent may include, e.g., ethanol, isopropyl alcohol, or the like. The aprotic solvent may include, e.g., nitriles such as R—CN (wherein R is a hydrocarbon group having a C2 to C20 linear, branched, or cyclic structure and may include a double bond, an aromatic ring, or an ether bond), or the like, dioxolanes such as 1,3-dioxolane or the like, sulfolanes, or the like.

The non-aqueous organic solvent may be used alone or in a mixture. When the organic solvent is used in a mixture, the mixture ratio may be controlled in accordance with a desirable battery performance.

In an implementation, the carbonate solvent may be prepared by mixing a cyclic carbonate and a linear carbonate. When the cyclic carbonate and linear carbonate are mixed together in a volume ratio of about 1:1 to about 1:9, an electrolyte performance may be improved.

The non-aqueous organic solvent may further include an aromatic hydrocarbon organic solvent in addition to the carbonate solvent. In an implementation, the carbonate solvent and the aromatic hydrocarbon organic solvent may be mixed in a volume ratio of about 1:1 to about 30:1.

The aromatic hydrocarbon organic solvent may be an aromatic hydrocarbon compound of Chemical Formula 3.

[Chemical Formula 3]

In Chemical Formula 3, $R^7$ to $R^{12}$ may each independently be, e.g., hydrogen, a halogen, a C1 to C10 alkyl group, a haloalkyl group, or a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In an implementation, the electrolyte may further include vinylene carbonate or an ethylene carbonate compound of Chemical Formula 4, e.g., in an effort to help improve cycle-life of a battery.

[Chemical Formula 4]

In Chemical Formula 4, $R^{13}$ and $R^{14}$ may each independently be, e.g., hydrogen, a halogen, a cyano group (CN), a nitro group ($NO_2$), or a fluorinated C1 to C5 alkyl group. In an implementation, at least one of $R^{13}$ and $R^{14}$ may be a halogen, a cyano group (CN), a nitro group ($NO_2$), or a fluorinated C1 to C5 alkyl group and $R^{13}$ and $R^{14}$ are not simultaneously hydrogen.

Examples of the ethylene carbonate compound may include difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle-life may be used within a suitable range.

The lithium salt dissolved in the non-aqueous organic solvent supplies lithium ions in a battery, facilitates a basic operation of a rechargeable lithium battery, and improves transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide, LiFSI), $LiC_4F_9SO_3$, $LiClO_4$, $LiAlO_2$, $LiAlCl_4$, $LiN(C_xF_{2y+1}SO_2)(C_yF_{2y+1}SO_2)$ (wherein x and y are natural numbers, for example, an integer ranging from 1 to 20), LiCl, LiI, and $LiB(C_2O_4)_2$ (lithium bis(oxalato) borate, LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

Another embodiment provides a rechargeable lithium battery including a positive electrode including a positive active material; a negative electrode including a negative active material; and the aforementioned electrolyte.

The positive electrode includes a current collector and a positive active material layer on the current collector and including a positive active material.

The positive active material may include lithiated intercalation compounds that reversibly intercalate and deintercalate lithium ions.

In an implementation, at least one composite oxide of lithium and a metal of cobalt, manganese, nickel, or a combination thereof may be used.

Examples of the positive active material may be a compound represented by one of chemical formulae below.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$).

In the above chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

The compounds may have a coating layer on the surface, or may be mixed with another compound having a coating layer. The coating layer may include at least one coating element compound, e.g., an oxide of a coating element, a hydroxide of a coating element, an oxyhydroxide of a coating element, an oxycarbonate of a coating element, or a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed using a suitable method having no adverse influence on properties of a positive active material by using these elements in the compound. In an implementation, the method may include a suitable coating method (e.g., spray coating, dipping, etc.).

In an implementation, the positive active material may be at least one of lithium composite oxides represented by Chemical Formula 2.

[Chemical Formula 2]

In Chemical Formula 2,
$0.9 \le a \le 1.8$, $0 \le y1 < 1$, $0 \le z1 < 1$, $0 \le y1+z1 < 1$, and $M^1$, $M^2$, and $M^3$ are each independently selected from a metal such as Ni, Co, Mn, Al, Sr, Mg, La, and a combination thereof.

In an implementation, $M^1$ may be Ni, and $M^2$ and $M^3$ may each independently be a metal, e.g., Co, Mn, Al, Sr, Mg, or La.

In an implementation, $M^1$ may be Ni, $M^2$ may be Co, and $M^3$ may be Mn or Al.

Examples of the positive active material according to an embodiment may include $Li_xNi_yCo_zAl_{1-y-z}O_2$ ($1 \le x \le 1.2$, $0.5 \le y \le 1$, and $0 \le z \le 0.5$).

The positive active material may be included in an amount of about 90 wt % to about 98 wt % based on a total weight of the positive active material layer.

In an implementation, the positive active material layer may include a binder and a conductive material. Herein, the binder and the conductive material may be included in an amount of about 1 wt % to about 5 wt %, respectively based on a total amount of the positive active material layer.

The binder may help improve binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to provide electrode conductivity. A suitable electrically conductive material that does not cause a chemical change may be used as a conductive material. Examples of the conductive material may include a carbon material such as natural graphite, artificial graphite, carbon black, acetylene black, Ketjen black, a carbon fiber, and the like; a metal material of a metal powder or a metal fiber including copper, nickel, aluminum, silver, and the like; a conductive polymer such as a polyphenylene derivative; or a mixture thereof.

In an implementation, the current collector may include, e.g., Al.

The negative electrode may include a current collector and a negative active material layer formed on the current collector and including a negative active material.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include a carbon material. The carbon material may be a suitable carbon negative active material in a rechargeable lithium ion battery. Examples thereof may include crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy includes an alloy of lithium and, e.g., Na, K, Rb, Cs, Fr, Be, Mg, Ca, Sr, Si, Sb, Pb, In, Zn, Ba, Ra, Ge, Al, or Sn.

The material capable of doping/dedoping lithium may be Si, a Si—C composite, $SiO_x$ ($0 < x < 2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of about 95 wt % to about 99 wt % based on a total weight of the negative active material layer.

In an implementation, the negative active material layer may include a binder, and optionally a conductive material. In the negative active material layer, a content of the binder may be about 1 wt % to about 5 wt % based on a total weight of the negative active material layer. When the negative active material layer further includes a conductive material, the negative active material layer includes about 90 wt % to about 98 wt % of the negative active material, about 1 wt % to about 5 wt % of the binder, and about 1 wt % to about 5 wt % of the conductive material.

The binder may help improve binding properties of negative active material particles with one another and with a current collector. The binder includes a non-water-soluble binder, a water-soluble binder, or a combination thereof.

The non-water-soluble binder may include, e.g., polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber binder or a polymer resin binder. The rubber binder may include, e.g., a styrene-butadiene rubber, an acrylated styrene-butadiene rubber (SBR), an acrylonitrile-butadiene rubber, an acrylic rubber, a butyl rubber, a fluorine rubber, or a combination thereof. The polymer resin binder may include, e.g., polytetrafluoroethylene, polyethylene, polypropylene, ethylenepropylene copolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose compound may be further used to provide viscosity. The cellulose-compound include, e.g., carboxymethyl cellulose, hydroxypropylmethyl cellulose, methyl cellulose, or alkali metal salts thereof. The alkali metals may be Na, K, or Li. Such a cellulose compound may be included in an amount of about 0.1 to about 3 parts by weight based on 100 parts by weight of the negative active material.

The conductive material is included to provide electrode conductivity. A suitable electrically conductive material that does not cause a chemical change in a battery may be used as a conductive material. Examples of the conductive material may include a carbon material such as natural graphite, artificial graphite, carbon black, acetylene black, Ketjen black, a carbon fiber, and the like; a metal material of a metal powder or a metal fiber including copper, nickel, aluminum silver, and the like; a conductive polymer such as a polyphenylene derivative; or a mixture thereof.

The current collector may include, e.g., a copper foil, a nickel foil, a stainless steel foil, a titanium foil, a nickel foam, a copper foam, a polymer substrate coated with a conductive metal, or a combination thereof.

The rechargeable lithium battery may further include a separator between the negative electrode and the positive electrode, depending on a type of the rechargeable lithium battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 1:
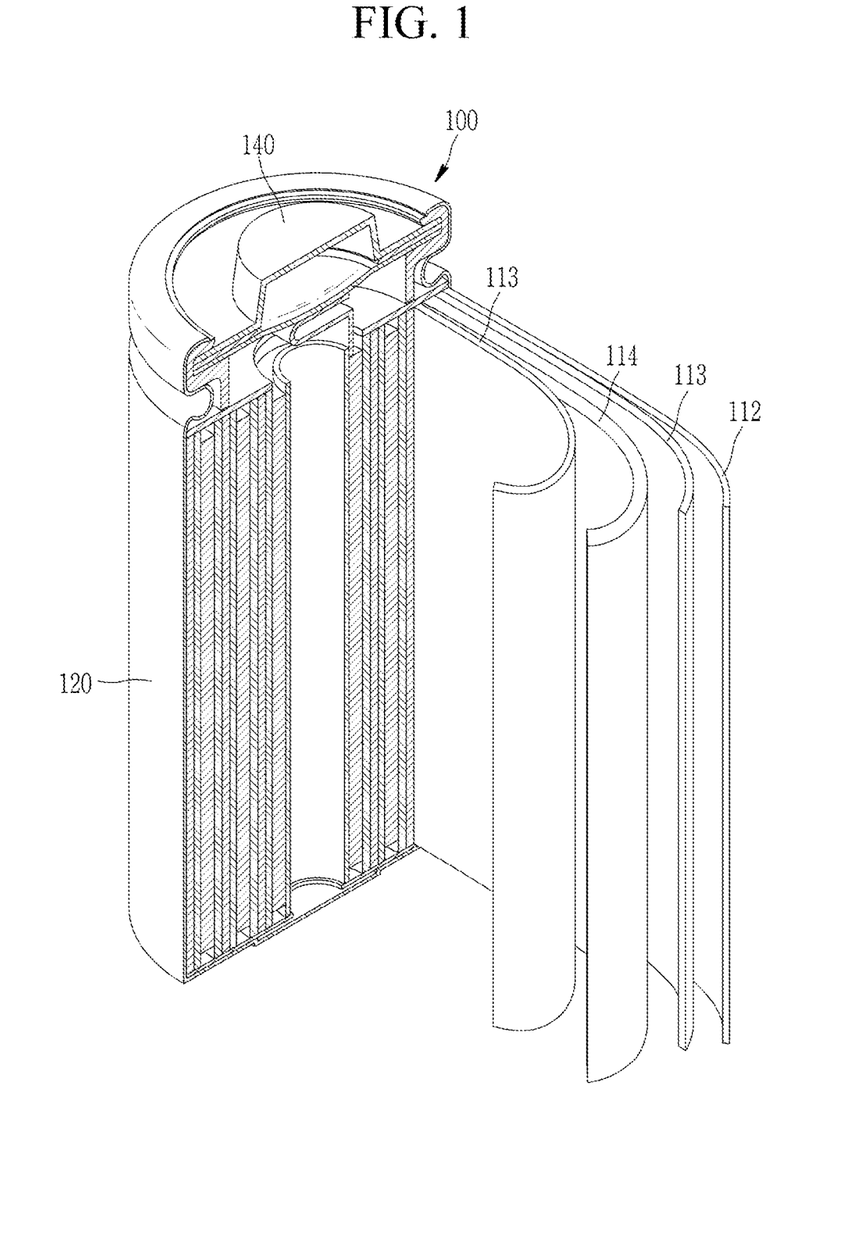
FIG. 1 is an exploded perspective view of a rechargeable lithium battery according to an embodiment.

Referring to FIG. 1, a rechargeable lithium battery 100 according to an embodiment may include, e.g., a battery cell including a negative electrode 112, a positive electrode 114 facing the negative electrode 112, a separator 113 interposed between the negative electrode 112 and the positive electrode 114, and an electrolyte (not shown) for a rechargeable lithium battery impregnating the negative electrode 112, the positive electrode 114, and the separator 113, a battery case 120 housing the battery cell, and a sealing member 140 sealing the battery case 120.

The following Examples and Comparative Examples are provided in order to highlight characteristics of one or more embodiments, but it will be understood that the Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Rechargeable Lithium Battery Cell

PREPARATION EXAMPLE 1

Synthesis of Compound A

Silver methanesulfonate (Ag-methanesulfonate, 18.59 g, 91.6 mmol) and triethylamine (9.27 g, 91.6 mmol) were dissolved in a dichloromethane solvent under a nitrogen atmosphere, and a temperature was decreased to 0° C. 2-chloro-1,3,2-dioxaphospholane (11.59 g, 91.6 mmol) was added to the mixed solution in a dropwise fashion and then, slowly heated from 0° C. to ambient temperature and stirred for 5 hours. When a reaction was complete, an excess of diethyl ether was added thereto, and a solid not dissolved therein was filtered and removed and then, dried to obtain compound A as a white powder (8.0 g, 80%).

$^1$H NMR (400 MHz, CDCl$_3$): δ 4.35 (m, 2H), 4.21 (m, 2H), 3.05 (s, 3H); $^{31}$P NMR: δ 128.88 (s, 1P).

[Compound A]

COMPARATIVE PREPARATION EXAMPLE 1

Synthesis of Compound B

Silver methanesulfonate (Ag-methanesulfonate, 18.59 g, 91.6 mmol) and triethylamine (27.8 g, 275 mmol) were dissolved in a dichloromethane solvent under a nitrogen atmosphere and then, cooled down to 0° C. Phosphorus trichloride (12.6 g, 91.6 mmol) was added to the obtained mixed solution in a dropwise fashion and then, maintained at the above temperature and then, heated to ambient temperature and further stirred for 1 hour at ambient temperature. The temperature was lowered to 0° C., and methanol (5.87 g, 183 mmol) was added thereto in a dropwise fashion and then, further stirred for 1 hour at ambient temperature. When a reaction was complete, an excess of diethyl ether was added thereto, and a solid not dissolved therein was filtered and removed and then, dried to obtain compound B as a white powder (12.5 g, 68%).

$^1$H NMR (400 MHz, CDCl$_3$): δ 3.68 (s, 6H), 2.95 (s, 3H), 2.85 (s, 3H); $^{31}$P NMR: δ 130.26 (s, 1P).

[Compound B]

COMPARATIVE PREPARATION EXAMPLE 2

Synthesis of Compound C

Methanesulfonic acid (8.8 g, 91.6 mmol) and triethylamine (27.8 g, 275 mmol) were dissolved in a dichloromethane solvent under a nitrogen atmosphere and then, cooled down to 0° C. Ethanol (8.43 g, 183 mmol) was added dropwise to the mixed solution, heated to ambient temperature, followed by stirring at ambient temperature for 1 hour. When a reaction was complete, an excess of diethyl ether was added thereto, and a solid not dissolved therein was filtered and removed and then, dried to obtain compound C as a white powder (14.7 g, 70%).

$^1$H NMR (400 MHz, CDCl$_3$): δ 3.85 (q, 4H), 2.95 (s, 3H), 2.85 (s, 3H), 1.25 (t, 6H).

[Compound C]

EXAMPLE 1

LiNi$_{0.88}$Co$_{0.105}$Al$_{0.015}$O$_2$ as a positive active material, polyvinylidene fluoride as a binder, and carbon black as a conductive material were respectively mixed in a weight ratio of 98:1:1 and then, dispersed in N-methyl pyrrolidone to prepare positive active material slurry.

The positive active material slurry was coated on a 20 μm-thick Al foil, dried at 100° C., and pressed to manufacture a positive electrode.

Graphite as a negative active material, a styrene-butadiene rubber as a binder, and carboxylmethyl cellulose as a binder were respectively mixed in a weight ratio of 98:1:1 and then, dispersed in distilled water to prepare negative active material slurry.

The negative active material slurry was coated on a 10 μm-thick Cu foil and then, dried at 100° C. and pressed to manufacture a negative electrode.

The positive electrode and the negative electrode were used with a 25 μm-thick polyethylene separator and an electrolyte to manufacture a rechargeable lithium battery cell.

A composition of the electrolyte was as follows.
(Electrolyte Composition)
Salt: LiPF$_6$ 1.5 M
Solvent: ethylene carbonate:methylethyl carbonate:dimethyl carbonate (EC:MEC:DMC=2:1:7 volume ratio)
Additive: 1.0 wt % of the compound A
(In the composition of the electrolyte, "wt %" is based on a total amount of the electrolyte (lithium salt+non-aqueous organic solvent+additive))

EXAMPLE 2

A rechargeable lithium battery cell was manufactured according to the same method as Example 1 except that the amount of the additive was 0.5 wt %.

EXAMPLE 3

A rechargeable lithium battery cell was manufactured according to the same method as Example 1 except that the amount of the additive was 3.0 wt %.

COMPARATIVE EXAMPLE 1

A rechargeable lithium battery cell was manufactured according to the same method as Example 1 except that the additive was omitted.

COMPARATIVE EXAMPLE 2

A rechargeable lithium battery cell was manufactured according to the same method as Example 1 except that the additive was the compound B according to Comparative Preparation Example 1.

COMPARATIVE EXAMPLE 3

A rechargeable lithium battery cell was manufactured according to the same method as Example 1 except that the additive was the compound C according to Comparative Preparation Example 2.

Evaluation of Cell Characteristics
Evaluation 1: Evaluation of CV Characteristics In order to evaluate electrochemical stability of the electrolytes according to Example 1 and Comparative Examples 1 to 3, cyclic voltammetry (CV) was measured, and the results are shown in FIGS. 2 to 4.

A trielectrode electrochemical cell using graphite as a working electrode and Li metal as a reference electrode and a counter electrode was used to measure CV of the negative electrodes. Herein, scan was 3 cycles performed from 3 V to 0 V and then from 0 V to 3 V at a scan rate of 0.1 mV/sec.

Figure 2:
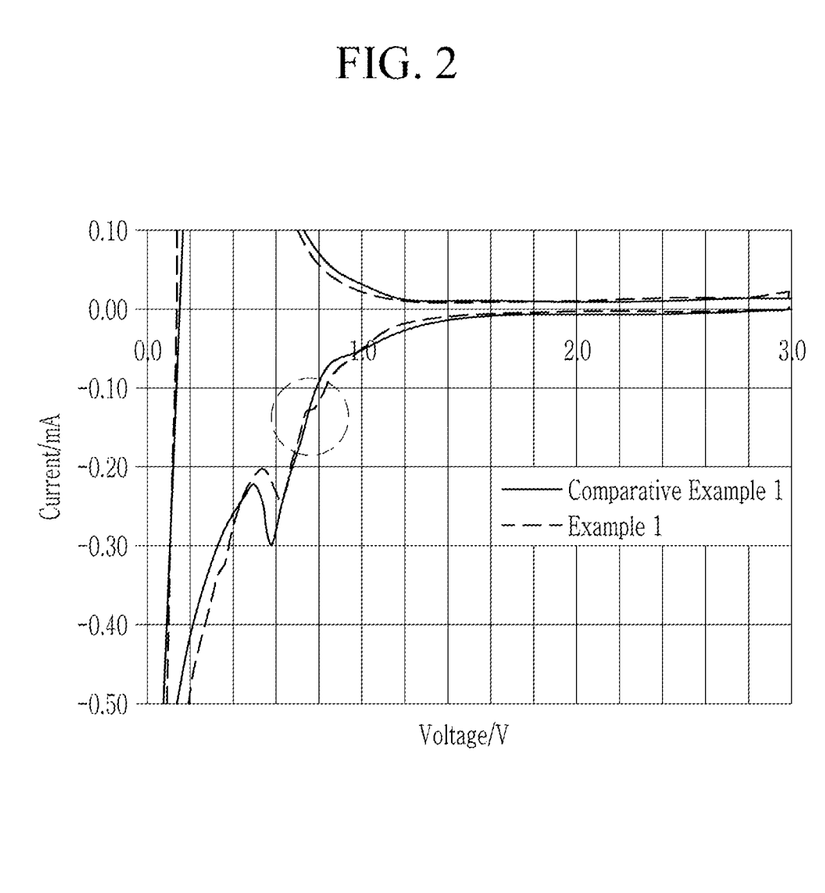
FIG. 2 is a graph showing the results of a negative electrode cyclic voltammetry (CV) at ambient temperature of the electrolytes according to Example 1 and Comparative Example 1.

FIG. 2 is a graph showing the results of a negative electrode cyclic voltammetry (CV) at ambient temperature of the electrolytes according to Example 1 and Comparative Example 1.

Figure 3:
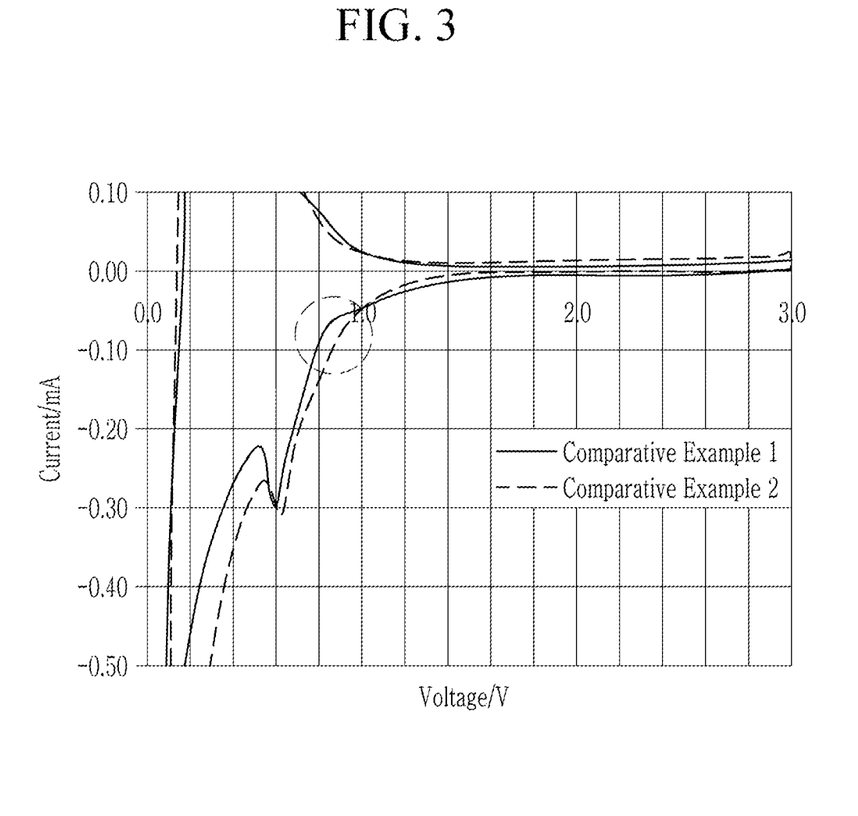
FIG. 3 is a graph showing the results of a negative electrode cyclic voltammetry (CV) at ambient temperature of the electrolytes according to Comparative Example 1 and Comparative Example 2.
Figure 4:
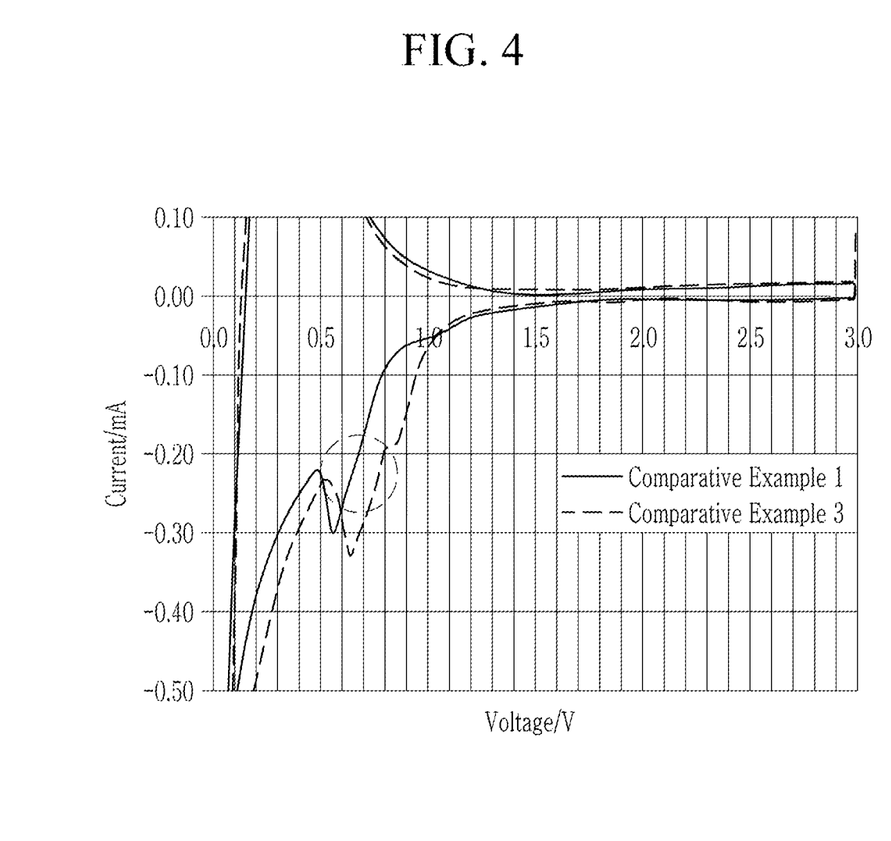
FIG. 4 is a graph showing the results of a negative electrode cyclic voltammetry (CV) at ambient temperature of the electrolytes according to Comparative Example 1 and Comparative Example 3.

FIG. 3 is a graph showing the results of a negative electrode cyclic voltammetry (CV) at ambient temperature of the electrolytes according to Comparative Example 1 and Comparative Example 2.

FIG. 4 is a graph showing the results of a negative electrode cyclic voltammetry (CV) at ambient temperature of the electrolytes according to Comparative Example 1 and Comparative Example 3.

As shown in FIG. 2, the electrolyte according to Example 1 including the additive according to an embodiment exhibited a reduction decomposition peak around 0.9 V.

Referring to FIG. 3, the electrolyte according to Comparative Example 2 including a linear phosphone functional group did not clearly exhibit a reduction decomposition peak.

Referring to FIG. 4, the electrolyte according to Comparative Example 3 not including a phosphone functional group, exhibited a reduction decomposition peak under a lower starting voltage, indicating that reactivity with the negative electrode was relatively low.

These show that the additive according to an embodiment may cause an interaction with the solvent, and accordingly, as for the electrolyte according to Example 1, an initial SEI film on the negative electrode may be expected to form over a wide voltage range before decomposition of the solvent during the charge in which lithium ions were intercalated into the negative electrode. Accordingly, the rechargeable lithium battery cell adopting the electrolyte of Example 1 was expected to have excellent battery performance, compared with the rechargeable lithium battery cell adopting the electrolyte having no initial SEI film according to Comparative Examples 1 to 3.

Evaluation 2: Evaluation of Storage Characteristics at High Temperature

Each rechargeable lithium battery cell according to Examples 1 to 3 and Comparative Examples 1 to 3 were stored at 60° C. in a state of charge (SOC=100%) for 30 days to evaluate an internal resistance increase rate at a high temperature (60° C.) storage, and the results are shown in Table 1.

Direct Current Internal Resistance (DC-IR) was measured according to the following method.

The cells of Examples 1 to 3 and Comparative Examples 1 to 3 were charged at 4 A and 4.2 V at ambient temperature (25° C.) and then, cut off at 100 mA and paused for 30 minutes. Subsequently, the cells were respectively discharged at 10 A for 10 seconds, at 1 A for 10 seconds, and at 10 A for 4 seconds and then, measured with respect to a current and a voltage at 18 seconds and at 23 seconds to calculate initial direct current internal resistance (a difference between resistance at 18 seconds and resistance at 23 seconds) according to $\Delta R=\Delta V/\Delta I$.

The cells were stored under a charge condition of 0.2 C and 4.2 V at 60° C. for 30 days, DC-IR was measured, and each resistance increase rate was calculated before and after the storage according to Equation 1. The results are shown in Table 1.

Resistance increase rate=[DC-IR after the storage for 30 days/initial DC-IR]×100   <Equation 1>

TABLE 1

|  | Initial DC-IR (mOhm) | DC-IR (mOhm) 60° C. @30 days | ΔDC-IR (%) |
|---|---|---|---|
| Example 1 | 35.1 | 38.2 | 109 |
| Example 2 | 35.3 | 39.3 | 111 |
| Example 3 | 36.8 | 38.3 | 104 |
| Comparative Example 1 | 35.8 | 42.9 | 120 |
| Comparative Example 2 | 35.6 | 43.2 | 121 |
| Comparative Example 3 | 35.3 | 44.3 | 125 |

Referring to Table 1, the resistance increase rates before and after the rechargeable lithium battery cells according to Examples 1 to 3 were stored at a high temperature decreased, compared with those according to Comparative Examples 1 to 3. From these results, the rechargeable lithium battery cells according to Examples 1 to 3 exhibited improved high temperature stability compared with those according to Comparative Examples 1 to 3.

Evaluation 3: Evaluation of Gas Generation Amount at High Temperature

For the rechargeable lithium battery cells according to Example 1 and Comparative Examples 1 to 3, gas generation amounts (mL) when stored for 1 day, 3 days, and 7 days respectively, while standing at 60° C. for 7 days, were measured using a refinery gas analyzer (RGA). The results are shown in Table 2.

TABLE 2

|  | Gas generation amount at storage of high temperature (60° C.) (mL) | | |
|---|---|---|---|
|  | 1 day | 3 days | 7 days |
| Example 1 | 0.027 | 0.031 | 0.037 |
| Comparative Example 1 | 0.031 | 0.039 | 0.039 |
| Comparative Example 2 | 0.047 | 0.059 | 0.064 |
| Comparative Example 3 | 0.055 | 0.059 | 0.060 |

Referring to Table 2, the gas generation amount of the rechargeable lithium battery cell after high temperature storage according to Example 1 was significantly reduced, compared with the rechargeable lithium battery cells according to Comparative Example 1 (without an additive), Comparative Example 2 (including an additive with a linear phosphonate functional group), and Comparative Example 3 (including an additive without a phosphonate functional group). When the electrolyte according to an embodiment was applied, swelling characteristics of the rechargeable lithium battery cells were improved.

Evaluation 4: Evaluation of Ambient Temperature Cycle-life Characteristics

The rechargeable lithium battery cells manufactured according to Examples 1 and Comparative Examples 1 to 3 were charged under a constant current-constant voltage with a condition of 1 C, 4.2 V, and 0.05 C cut-off and discharged under a constant current with a condition of 1.0 C and 3.0 V at ambient temperature (25° C.). After performing charge and discharge 200 times, the discharge capacities were measured. The ratios (capacity retention) of discharge capacity at the $200^{th}$ cycle relative to the discharge capacity at the $1^{st}$ cycle were calculated. The results are shown in Table 3.

TABLE 3

|  | Recovery capacity @200 cycle (%) |
|---|---|
| Example 1 | 95.5 |
| Comparative Example 1 | 94.2 |
| Comparative Example 2 | 93.9 |
| Comparative Example 3 | 94.3 |

Referring to Table 3, the recovery capacity of the rechargeable lithium battery cell according to Example 1 was improved, compared with the rechargeable lithium battery cells according to Comparative Example 1 (without an additive), Comparative Example 2 (including an additive with a linear phosphonate functional group), and Comparative Example 3 (including an additive without a phosphonate functional group).

The charge/discharge cycle characteristics of Example 1 were superior to those of Comparative Examples 1 to 3, indicating that the rechargeable lithium battery cells including an electrolyte that included the compound represented by Chemical Formula 1 as an additive exhibited excellent cycle-life characteristics.

By way of summation and review, $LiPF_6$ may be used as a lithium salt of an electrolyte, and may react with an electrolytic solvent to promote depletion of a solvent and generate a large amount of gas. When $LiPF_6$ is decomposed, it generates LiF and $PF_5$, which may lead to electrolyte depletion in the battery, resulting in degradation in high temperature performance and poor safety.

An electrolyte according to an embodiment may help suppress side reactions of such a lithium salt and may help improve the performance of the battery.

One or more embodiments may provide an additive capable of providing high temperature stability to help improve battery performance.

A rechargeable lithium battery having improved high temperature stability and cycle-life characteristics may be implemented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a rechargeable lithium battery, the electrolyte comprising:
   a non-aqueous organic solvent,
   a lithium salt, and
   an additive represented by Chemical Formula 1:

[Chemical Formula 1]

wherein, in Chemical Formula 1,
$X^1$ and $X^2$ are each independently O, S, $CR^aR^b$, or $NR^c$, at least one of $X^1$ and $X^2$ being O or S,
$R^1$ is a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group,
$R^a$, $R^b$, $R^c$, and $R^2$ to $R^5$ are each independently hydrogen, a substituted or unsubstituted C1 to C5 alkyl group, a substituted or unsubstituted C2 to C5 alkenyl group, or a combination thereof, and
n is an integer selected from 1 to 3.

2. The electrolyte as claimed in claim 1, wherein the additive is included in the electrolyte in an amount of 0.1 wt % to 10 wt %, based on a total weight of the electrolyte for the rechargeable lithium battery.

3. The electrolyte as claimed in claim 1, wherein the additive is included in the electrolyte in an amount of 0.1 wt % to 3.0 wt %, based on a total weight of the electrolyte for the rechargeable lithium battery.

4. The electrolyte as claimed in claim 1, wherein n is 2 or 3.

5. The electrolyte as claimed in claim 1, wherein at least one of $X^1$ and $X^2$ is S.

6. The electrolyte as claimed in claim 1, wherein $R^1$ is a substituted or unsubstituted C1 to C10 alkyl group, a substituted or unsubstituted C1 to C10 alkoxy group, a substituted or unsubstituted C3 to C10 cycloalkyl group, a substituted or unsubstituted C3 to C10 cycloalkenyl group, or a substituted or unsubstituted C6 to C20 aryl group.

7. The electrolyte as claimed in claim 1, wherein the additive represented by Chemical Formula 1 is represented by Chemical Formula 1A:

[Chemical Formula 1A]

wherein, in Chemical Formula 1A, $X^1$, $X^2$, and $R^1$ to $R^5$ are defined the same as those of Chemical Formula 1.

8. The electrolyte as claimed in claim 1, wherein the additive represented by Chemical Formula 1 is represented by one of Chemical Formula 1-1 to Chemical Formula 1-3:

[Chemical Formula 1-1]

[Chemical Formula 1-2]

[Chemical Formula 1-3]

wherein, in Chemical Formula 1-1 to Chemical Formula 1-3, le to $R^5$ and n are defined the same as those of Chemical Formula 1.

9. The electrolyte as claimed in claim 1, wherein $R^1$ of Chemical Formula 1 is an unsubstituted C1 alkyl group, a substituted or unsubstituted C2 to C10 alkyl group or a substituted or unsubstituted C2 to C5 alkenyl group.

10. A rechargeable lithium battery, comprising:
a positive electrode comprising a positive active material;
a negative electrode comprising a negative active material; and
the electrolyte as claimed in claim 1.

11. The rechargeable lithium battery as claimed in claim 10, wherein the positive active material includes a composite oxide including cobalt, manganese, nickel, or a combination thereof, and lithium.

12. The rechargeable lithium battery as claimed in claim 10, wherein the positive active material is represented by Chemical Formula 2:

$$Li_aM^1_{1-y1-z1}M^2_{y1}M^3_{z1}O_2 \quad \text{[Chemical Formula 2]}$$

wherein, in Chemical Formula 2,
$0.9 \leq a \leq 1.8$, $0 \leq y1 < 1$, $0 \leq z1 < 1$, $0 \leq y1+z1 < 1$, and $M^1$, $M^2$, and $M^3$ are each independently Ni, Co, Mn, Al, Sr, Mg, La, or a combination thereof.

13. The rechargeable lithium battery as claimed in claim 10, wherein the additive is included in the electrolyte in an amount of 0.1 wt % to 10 wt %, based on a total weight of the electrolyte for the rechargeable lithium battery.

14. The rechargeable lithium battery as claimed in claim 10, wherein the additive is included in the electrolyte in an amount of 0.1 wt % to 3.0 wt %, based on a total weight of the electrolyte for the rechargeable lithium battery.

* * * * *